United States Patent

[11] 3,627,930

[72] Inventor Warren R. Tolman
Indianapolis, Ind.
[21] Appl. No. 869,777
[22] Filed Oct. 27, 1969
[45] Patented Dec. 14, 1971
[73] Assignee Bell Telephone Laboratories, Incorporated
Murray Hill, N.J.

[54] DIAL-IN-HANDSET TELEPHONE ASSEMBLY
2 Claims, 9 Drawing Figs.

[52] U.S. Cl. .................... 179/100 R, 179/103
[51] Int. Cl. .................... H04m 1/02
[50] Field of Search .................... 179/100 R, 100 D, 100 L, 102, 103, 178, 179

[56] References Cited
UNITED STATES PATENTS 3,123,676 3/1964 Prescott et al. ............... 179/90 K

FOREIGN PATENTS 1,118,263 11/1961 Germany ............... 179/100 D
1,146,123 3/1963 Germany ............... 179/100 D

OTHER REFERENCES

K. E. Hammer, " Handsets with Transistor Amplifiers," Bell Laboratories Record, May 1964, pp. 159- 164

*Primary Examiner*—Kathleen H. Claffy
*Assistant Examiner*—Randall P. Myers
*Attorneys*—R. J. Guenther and Edwin B. Cave

ABSTRACT: In a dial-in-handset telephone, manufacture and assembly are simplified and weight and costs are reduced by a number of structural features that serve to integrate the subassemblies of the set into a single integral unit. These features include combining the dial and network discrete components on a single double-sided flexible printed circuit board and the use of extended brackets mounted on the pushbutton dial assembly as a telephone set chassis.

INVENTOR
W. R. TOLMAN
BY
ATTORNEY

DIAL-IN-HANDSET TELEPHONE ASSEMBLY

BACKGROUND OF THE INVENTION

1. Field of the invention

This invention relates to dial-in-handset telephone sets and more particularly to the overall physical structure of such sets.

2. Description of the Prior Art

Dial-in-handset telephones are well known in the art, as shown for example by R. E. Prescott and E. Watkinson in U.S. Pat. No. 3,123,676, issued March 3, 1964. As the name suggests, the distinguishing feature of such sets is that the dial, as well as the entire speech network is mounted or incorporated within the handset itself in contrast to the more conventional arrangement of utilizing the handset proper as a mounting means for the transmitter and receiver elements while incorporating the dial and all circuit elements within a separate base or stand. Despite the use heretofore of printed wiring boards and other miniaturization techniques, the inclusion of virtually all elements of the telephone within the handset has resulted in undue complexity in fabrication, particularly in the assembly portion thereof, and excessive weight and cost, as well as problems of maintenance, particularly in those instances where either partial or complete disassembly is required.

Accordingly, the broad object of the invention is to alleviate or overcome the disadvantages and problems noted.

SUMMARY OF THE INVENTION

The stated object and related objects are achieved in accordance with the principles of the invention by combining a number of structural features so that a close approach is made toward integrating the various subassemblies involved into an integral unit. One of these features is the combination of a pair of extended brackets with the dial assembly to serve the function of a telephone set chassis which is uniquely but simply joined to the telephone handset housing and to the transmitter unit housing as well. A compartmented base or bottom deck for the dial assembly serves multiple functions in that it provides a protected mounting surface for both the integrated circuit of the dial signal generator and the common switch contacts. Virtually all circuit paths are imprinted on a flexible printed circuit board (flex) that extends the full length of the set from the transmitter to the receiver, and those discrete circuit elements that are required for the voice network and the oscillator of the dial signal generator are conveniently hung from appropriate terminals on the flex.

DETAILED DESCRIPTION

Figure 1:
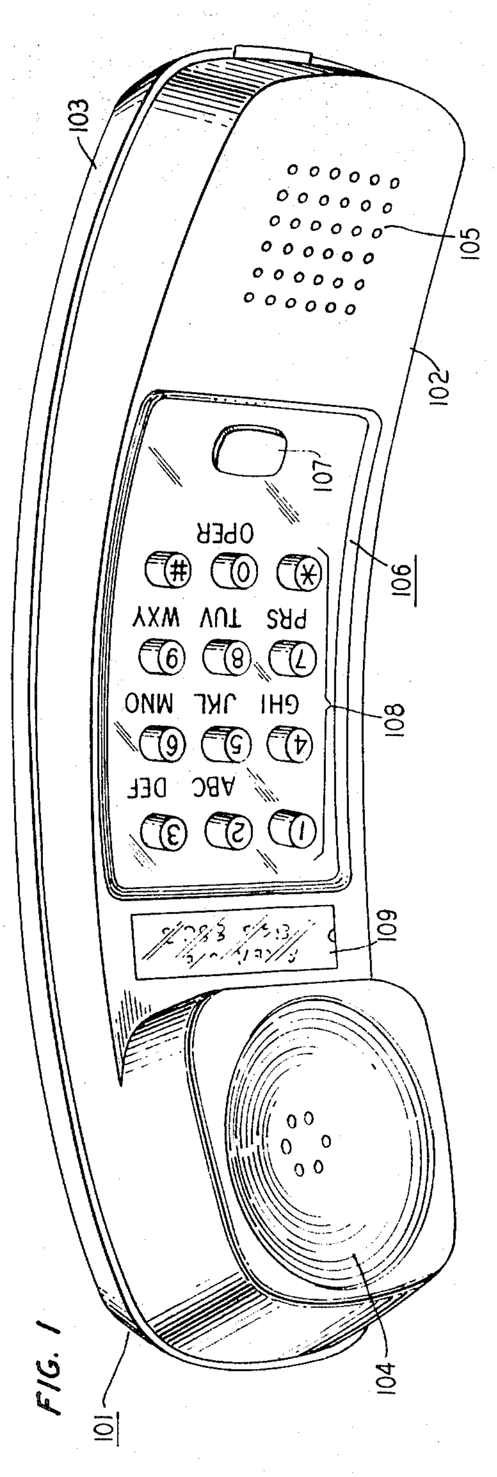
FIG. 1 is a front perspective view of a handset in accordance with the invention.

As shown in FIG. 1, the exterior of a telephone handset in accordance with the invention reveals a top housing portion 102 and a bottom housing portion 103 which are joined together by a snap fit. The pushbutton dial 106 is positioned in the approximate center portion of the set. The receiver 104 is contained within the raised end portion at one end of the set, and the transmitter 105 is housed within the opposite or tapered end. The visible portion of the dial includes a total of 12 pushbuttons 108 with conventional alphanumeric markings or special purpose symbols. Also visible is a small access cover 109 and a recall button 107.

Figure 2:
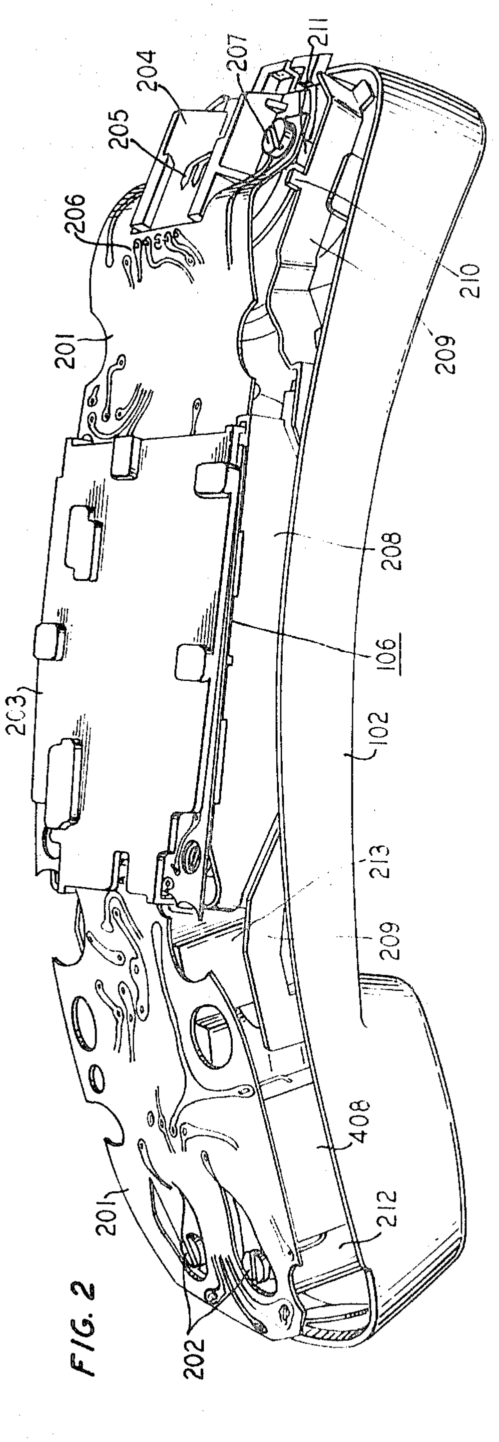
FIG. 2 is the handset of FIG. 1 with the bottom housing removed.

Removing the bottom housing 103 from the set, as shown in FIG. 2, discloses a flex 20 extending the full length of the housing with the center portion thereof protected by a dial bottom cover 203. The dial assembly 106 is further protected on three sides by a dial assembly side cover 208 secured thereto by suitable snaps, not shown. At the receiver end of the handset the flex 201 is conductively connected to the receiver housing connector cup by terminal screws 202. Similarly, at the transmitter end of the set the flex 201 is conductively connected to the transmitter housing connector cup 204 by means of terminal screws 207, only one of which is shown in FIG. 2. A plurality of cord plug contactors 205 are shown mounted on the top portion of the transmitter housing connector cup 204. The bottom portion of these contactors, not shown, are connected from the underside to a set of terminals 206 on the flex 201. The flex 201 employs printed-through holes and is printed on both sides for maximum utilization of the flex area. Also visible in FIG. 2 is a portion of a dial assembly bracket 209 which is mounted on the dial assembly 106 and which extends longitudinally outward from the dial structure proper toward both ends of the set. At the transmitter end a lug or projection 210 abuts a stud 211 on the transmitter housing connector cup 204 to facilitate overall alignment and rigidity of the assembly.

Figure 3:
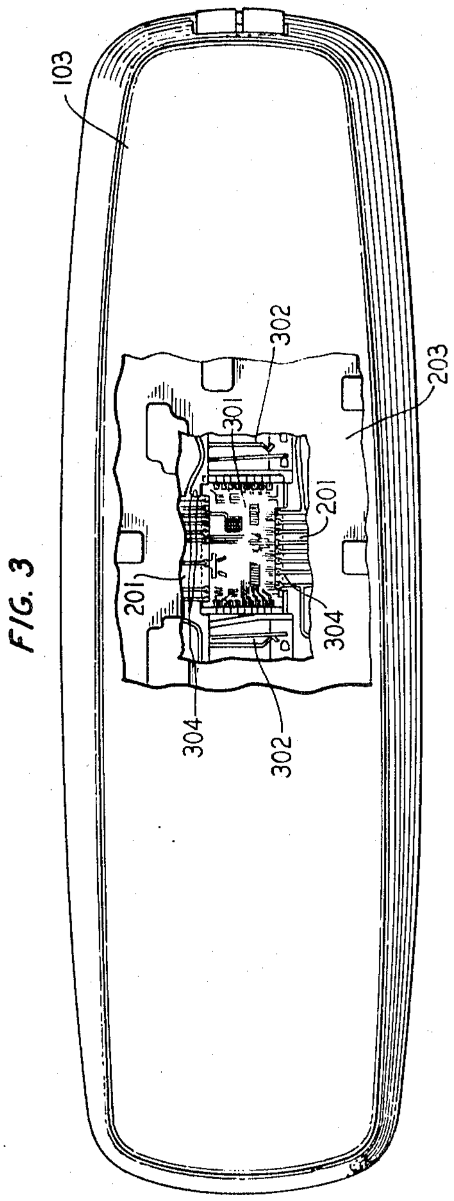
FIG. 3 is a bottom view, partially cut away, of the handset of FIG. 1.

Directly under the dial bottom cover 203, as shown in the cutaway portion of FIG. 3, is a thin-film integrated circuit 301 which includes on a single substrate the bulk of the resistance and capacitance circuit elements and the two appliqued active SICs that are required for the RC oscillator of the dial signal generator. This circuit may be of the type disclosed by R. L. Breeden and R. M. Rickert in U.S. Pat. No. 3,424,870 issued Jan. 28, 1969. The integrated circuit 310 is positioned within a cutaway portion of the flex 201 so that necessary soldered connections between the terminals of the integrated circuit 301 and the terminals 304 of the flex may readily be effected. The spring contacts 302 of the common switch are separated into two modules and, as shown in FIG. 3, each is positioned next to a respective end of the integrated circuit 301. This arrangement is shown in greater detail in FIG. 9 and will be discussed further hereinbelow in connection with the description of that Figure.

Figure 4:
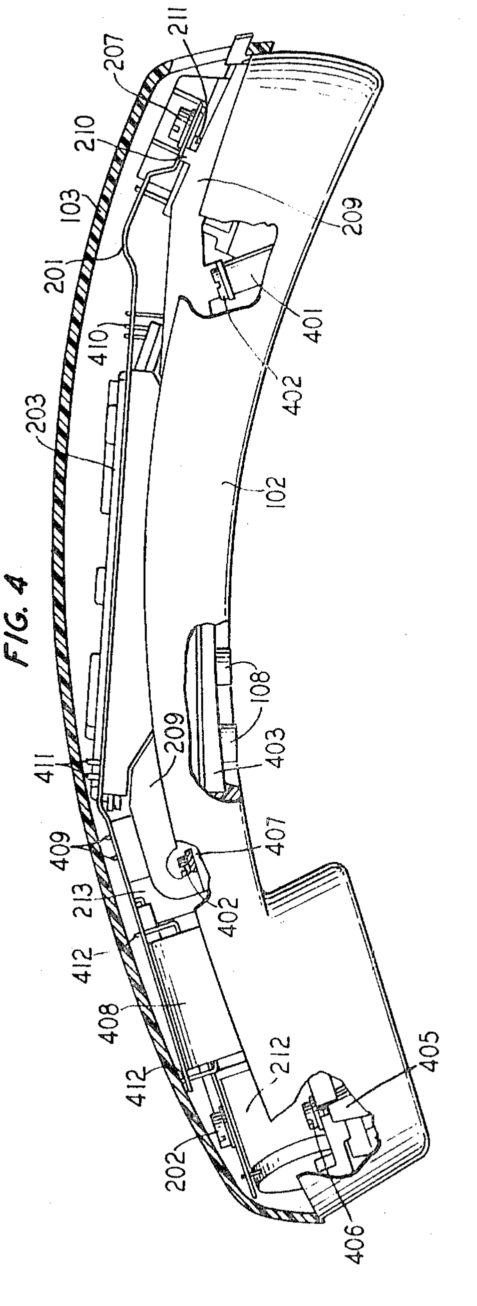
FIG. 4 is a side view, partially cut away, of the handset of FIG. 1.
Figure 5:
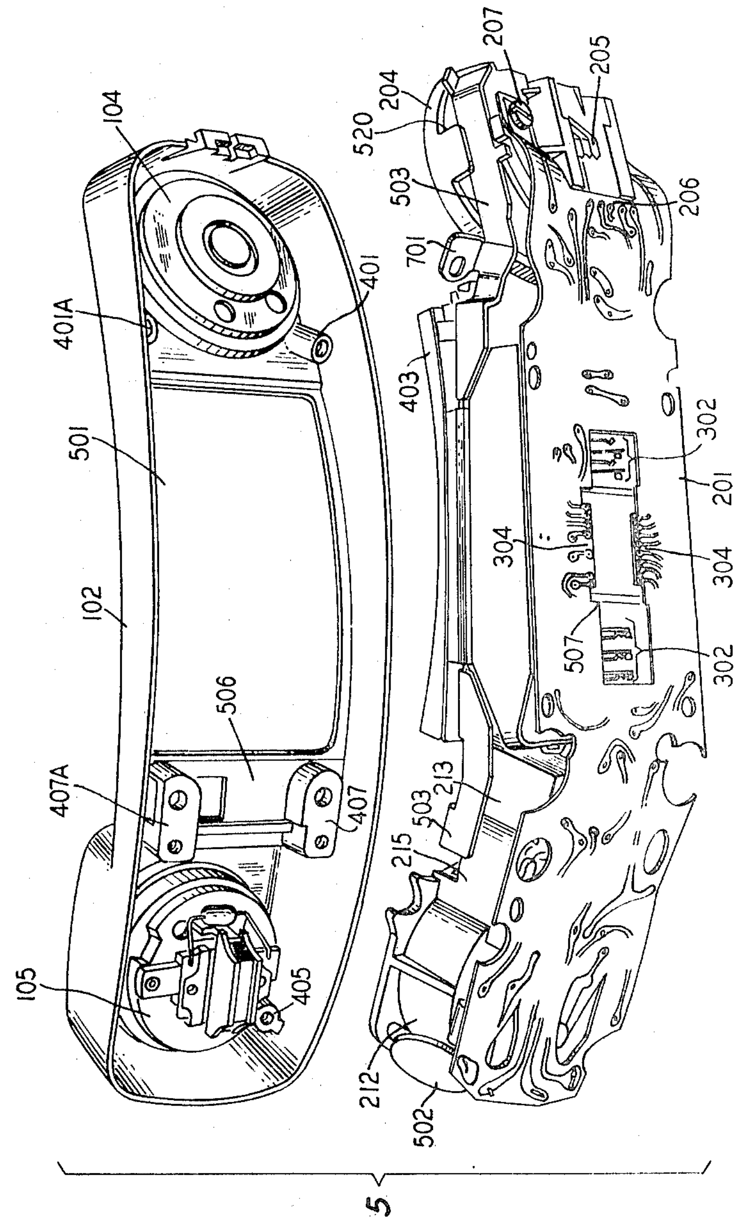
FIG. 5 is a partially exploded view of the handset of FIG. 2 with the subassembly of the dial, the flex and the transmitter and receiver housing connector cups shown removed from the top housing.

Additional details disclosed in the side view of FIG. 4 include the means employed to anchor the dial assembly brackets (one of which, 209, is shown) to the top housing 102. Integral with the top housing 102, as shown partially in FIG. 4 and fully in FIG. 5, is a first pair of support posts 401 and 401A and a second pair of similar posts 405 and 405A. The thread-cutting screws 402 inserted through the apertured tabs 701 and 703 of the right dial bracket 503 and the left dial bracket 209, respectively, are inserted in the posts 401 and 401A. At the opposite end of the set similar screws are inserted into the accommodating apertures of the posts 407 and 407A to anchor the tabs 704 and 702 of the left 209 and right 503 dial assembly brackets, respectively. When the screws 402 are removed from the four tabs 701 through 704 of the dial brackets 209 and 503, the complete dial assembly combination, which includes the dial assembly 106, the transmitter housing connector cup 204, the receiver housing connector cup 212 and the flex 201, may simply be lifted free from the receiver 104, the transmitter 105 and the top housing 102, provided that two screws, not shown, holding down the receiver cup have been removed This removal is illustrated in FIG. 5.

Figure 6:
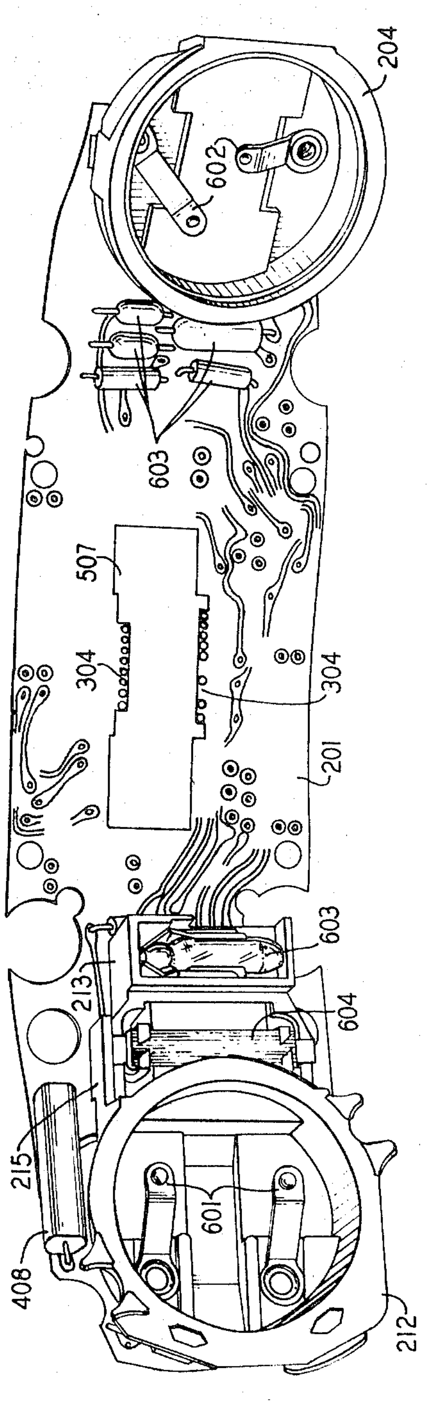
FIG. 6 is the subassembly of FIG. 5 with the dial assembly portion thereof removed.
Figure 7:
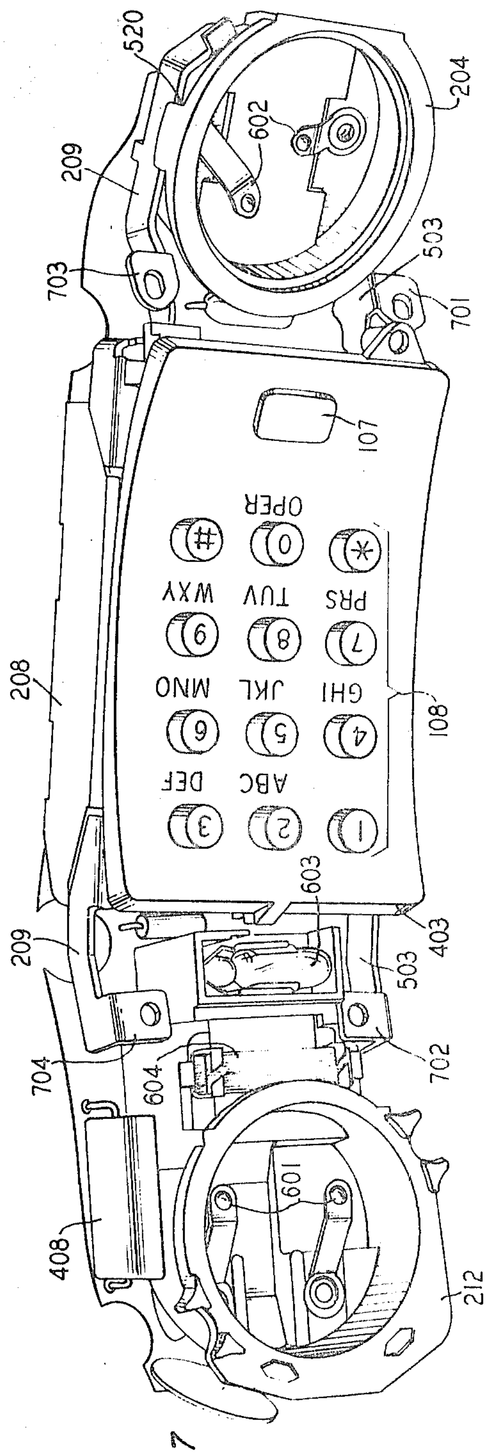
FIG. 7 is a front perspective view of the subassembly of FIG. 5.

Viewing this last-described assembly from the top as shown in FIG. 7 discloses a number of additional details and important features of the invention. The receiver housing connector cup 212 serves multiple functions in that its structure includes a housing 203 for mounting a light 603, and additionally includes a housing 215 for mounting a speech network transformer 604. Contacts 601 which serve as connecting means between the receiver 104 and the flex 201 are shown inside the receiver housing connector cup. Similar terminals 602 are provided at the transmitter end as shown in FIGS. 6, 7 and 8.

When the dial assembly proper is removed from the assembly shown in FIG. 7, the structure remaining is as shown IN FIG. 6 were the cutaway portion 507 of the flex 201 is clearly visible. Also visible is a large capacitor 408 and a group of other discrete circuit elements 603 which are in effect hung from or connected to suitable terminals on the flex.

Figure 8:
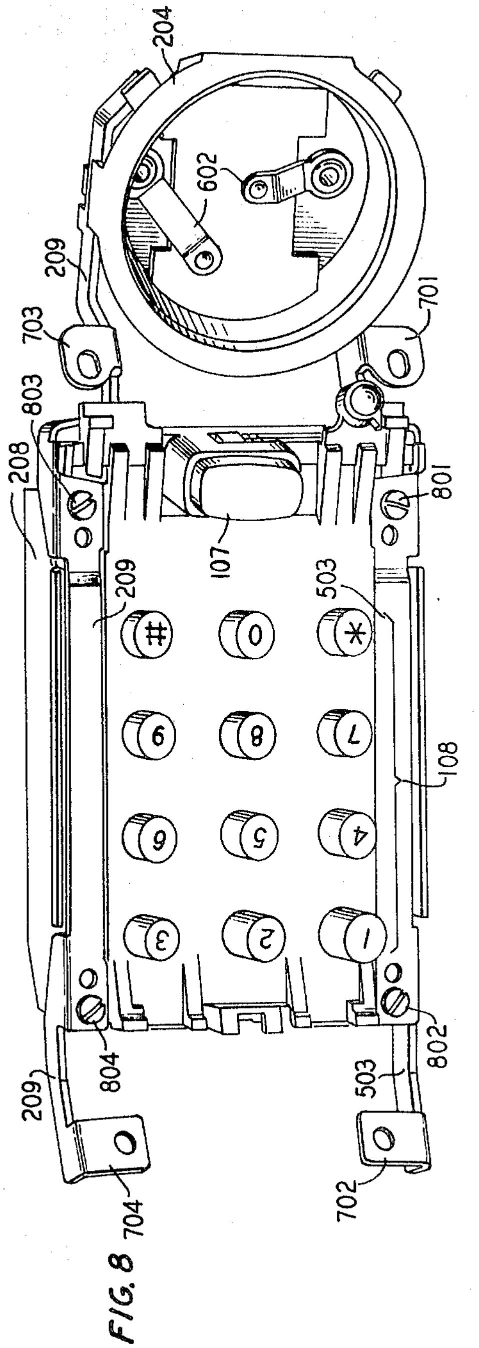
FIG. 8 is a top perspective view of the dial assembly.
Figure 9:
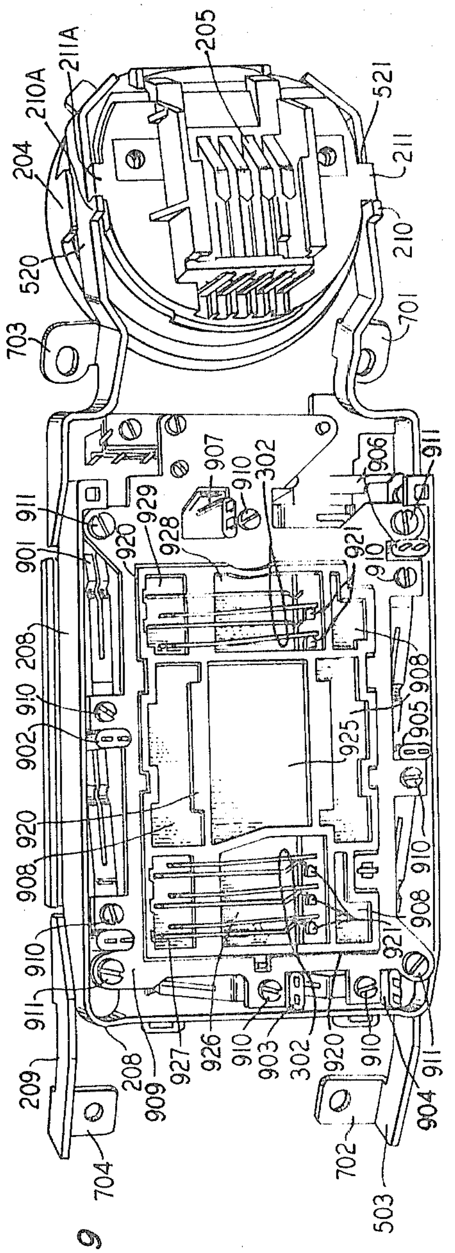
FIG. 9 is a bottom perspective view of the assembly of FIG. 8.

The complete dial assembly 106 may also be viewed as including the transmitter housing connector cup 204, as shown in FIG. 8, in that the dial assembly brackets 503 and 209 are fitted into accommodating slots 520 and 521 on the cup 204 as best shown in FIG. 9. An important part of the dial assembly 106, which has been removed from the assembly as shown in FIG. 8, but which is present in the assembly as shown in FIG. 7, is a light guide plate 403 which also serves as a dial faceplate. The light guide plate 403 is fabricated from a suitable translucent plastic materials which conducts and diffuses light from the lamp 603, with the result that the entire dial face is evenly illuminated. Viewing the dial assembly 106 from the reverse or back side, as shown in FIG. 9, discloses a dial assembly retaining frame 909 which is affixed to the bottom portion of the dial assembly by four screws 911. Each of the seven screws 190 serves to secure or position a respective one of the spring contact pileups for the seven dial frequency switches 901 through 907. In conventional fashion, each of these switches 901 through 907 responds to the operation or depression of any of the buttons 108 in a respective row or column in order to effect translation from a decimal digit to a two-out-of-seven code for multifrequency signal transmission.

The unique construction of the lower deck 920 of the dial assembly 106 is best illustrated in FIG. (. The generally rectangular deck which is fitted inside of the dial assembly retaining frame 909 includes a central depressed area or compartment 925 which accommodates the thin-film integrated circuit 301 which is shown positioned in FIG. 3. Similar depressions or compartments 926 through 929 at either end of the deck 920 accommodate the contacts 302 of the common switch. Tabs 921 of the common switch operating card are also visible in FIG. 9. The compartment areas 908 in the dial assembly bottom deck 920 are merely structural details. Positioning the integrated circuit 301 and the common switch 302 in accordance with the invention in the compartments indicated in the dial assembly bottom deck member 920 ensures a high degree of physical security and protection for these elements. Additional protection is provided by the dial bottom cover 203 shown in FIG. 2 and as a result, the assembly enjoys a suprisingly high tolerance to physical shock.

It is to be understood that the embodiment described herein is merely illustrative of the principles of the invention. Various modifications thereto may be effected by persons skilled in the art without departing from the spirit and scope of the invention.

What is claimed is:

1. A pushbutton dial-in-handset telephone set comprising, in combination, a handset housing, a chassis portion comprising a substantially rectangular dial assembly with bracket members extending longitudinally outward from each of the four corners thereof, a transmitter and a mounting cup therefor, a receiver and a mounting cup therefor, means for supporting said transmitter cup by said brackets, means for anchoring each end of said brackets to a respective portion of said housing, a double-sided flexible printed circuit board interconnecting said transmitter cup, said receiver cup and said dial assembly, said circuit board having an aperture in the approximate center portion thereof underneath said dial assembly, said dial assembly including a top deck portion, a bottom deck portion having a plurality of compartmented areas on the underside thereof, a dial signal generator circuit in integrated form positioned within one of said compartmented areas, a two-module common switch, each of said modules being positioned within a respective one of said compartmented areas, said compartmented areas being positioned within said aperture thereby to facilitate electrical connections to said circuit board from said switch and said generator circuit, said dial assembly further including a bottom cover member, said circuit board including said aperture being positioned between said areas and said bottom cover member, thereby to afford mechanical protection to said generator circuit and said switch.

2. Apparatus in accordance with claim 1 wherein said dial assembly further includes a multifunction retaining ring member for locking said bottom deck in place, for providing a mounting means for dial frequency switch spring pileups, and for mounting a recall switch.

* * * * *

UNITED STATES PATENT OFFICE
CERTIFICATE OF CORRECTION

Patent No. 3,627,930 Dated December 14, 1971

Inventor(s) Warren R. Tolman

It is certified that error appears in the above-identified patent and that said Letters Patent are hereby corrected as shown below:

Col. 2, line 10, after "flex" cancel "20 and insert --201--;
line 41, after "circuit" cancel "310" and insert --301--;
line 73, after "removed" insert a period.

Col. 3, line 11, change "IN" to --in--;
line 24, after "plastic" cancel "materials" and insert --material--;
line 30, after "screws" cancel "190" and insert --910--;
line 38, after "FIG." cancel "(" and insert --9--.

Signed and sealed this 13th day of June 1972.

(SEAL)
Attest:

EDWARD M.FLETCHER,JR.
Attesting Officer

ROBERT GOTTSCHALK
Commissioner of Patents